United States Patent [19]
Worrix

[11] 3,799,635
[45] Mar. 26, 1974

[54] UNIVERSAL BEARING ASSEMBLY
[75] Inventor: Matthew L. Worrix, Sheridan, Oreg.
[73] Assignee: Allis-Chalmers Corporation, Milwaukee, Wis.
[22] Filed: Feb. 26, 1973
[21] Appl. No.: 335,765

[52] U.S. Cl. ............................................. 308/189
[51] Int. Cl. ............................................ F16c 19/14
[58] Field of Search ......................... 308/189, 193

[56]  References Cited
UNITED STATES PATENTS
618,132   1/1899   Powdrill et al. ................. 308/189
1,402,794  1/1922   Reese ................................ 308/189
FOREIGN PATENTS OR APPLICATIONS
226,841   3/1926   Great Britain ..................... 308/193

Primary Examiner—Manuel A. Antonakas
Assistant Examiner—Frank Susko
Attorney, Agent, or Firm—Robert C. Jones

[57] ABSTRACT

A universal bearing assembly comprising an outer tubular housing provided at each axial end with an internal bearing seat which receives antifriction bearings. An axially disposed tubular core is disclosed within the housing. At each end of the tubular core retaining members are provided which operate to maintain the assembly in operative relationship and also to preload the bearings.

7 Claims, 2 Drawing Figures

UNIVERSAL BEARING ASSEMBLY

BACKGROUND OF THE INVENTION

This invention relates to a bearing assembly and more particularly to an antifriction bearing assembly which is particularly well adapted for utilization in an exposed location which is subject to extreme conditions of weather and corrosion. In certain types of structures, for example, outdoor electrical disconnect switches of various types having members which must be supported in a manner that rotational motion may be imparted to the support member, various types of bearing supports have been utilized for this purpose. The type of construction of the various bearing supports heretofore utilized have all been custom manufactured for the individual installation. The individual support must provide both the mechanical characteristics necessary for the structural member to be supported and must also conform to an arrangement which is easily and readily adapted to be mounted on other structures. In addition, the bearing support must be constructed and arranged to withstand the corrosive effect of the environment in which it is located.

In the interest of efficiency and economy it is highly desirable to provide a universal type of bearing assembly which is adaptable to a wide range of operational installations without sacrificing any of the characteristics of custom manufactured devices.

Another object of this invention is to provide a universal bearing assembly which is adaptable to receive a plurality of spindle variations.

Still another object of this invention is to provide a universal bearing assembly in which the bearings are easily and fully protected.

Another object of this invention is to provide a universal bearing assembly in which preloading of the bearing elements can be accomplished as desired at any time, and which can be easily and quickly accomplished in the field.

Yet another object of this invention is to provide a universal bearing assembly which is constructed of a minimum number of components.

Another object of this invention is to provide a universal bearing assembly having a number of off-the-shelf components to minimize the cost thereof.

SUMMARY OF THE INVENTION

In accordance with the invention a tubular coupling member threaded at both ends is provided. The coupling member is disposed within a tubular housing and supported therein for rotation by antifriction bearings. To this end the inner surfaces at each end of the housing are formed with annular surfaces which receive the one race of an associated antifriction bearing. A bearing retainer nut ring is threadedly engaged on each end of the coupling member and each is constructed and arranged with an annular surface which engages the opposed race of an associated antifriction bearing. The coupling member and the antifriction bearings are retained in coaxially operative assembled positions within the housing by the retainer nut rings. Preloading adjustment of the antifriction bearings to the desired loading is also accomplished through the retainer nut ring.

DESCRIPTION OF THE INVENTION

Figure 1:
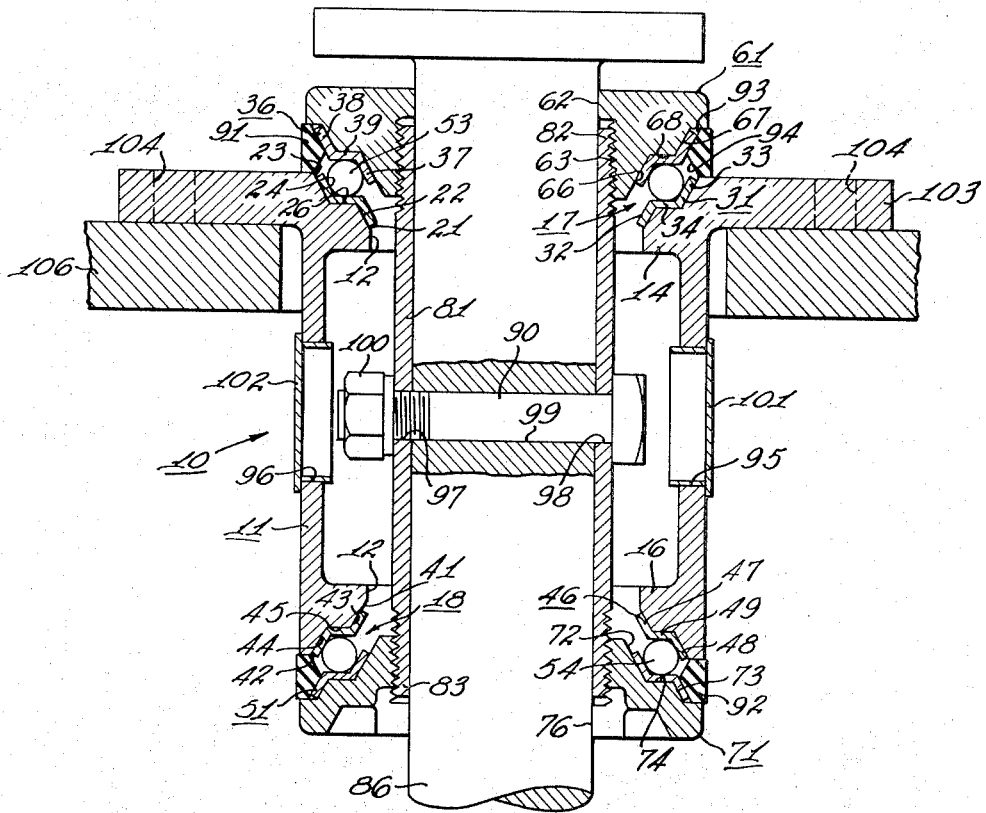
FIG. 1 is a view partly in elevation and partly in vertical section through the bearing assembly of this invention.
Figure 2:
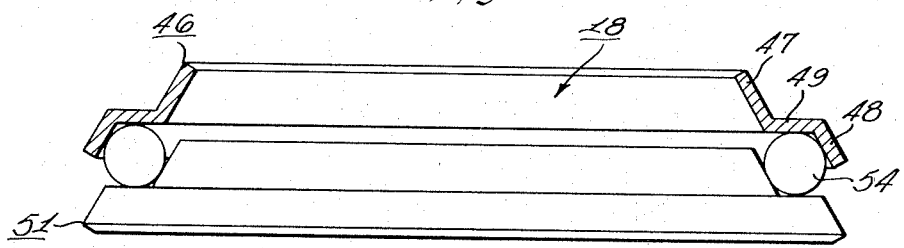
FIG. 2 is an enlarged view in partial elevation and partial section of an antifriction bearing utilized in the bearing assembly in FIG. 1.

Referring now to the drawings in which a universal bearing assembly 10 is depicted. As shown, the assembly 10 includes the generally tubular housing 11 having an axial bore 12. At each axial end of the bore 12 there is provided an inwardly extending radial flange 14 and 16 which are constructed and arranged to receive identical antifriction bearings 17 and 18. To this end the upper radial flange 14 is provided with a conical counterbore 21 which forms a circular surface 22. The upper outer axial end of the bore 12 is formed with another conical counterbore 23. In providing the counterbore 23 a circular surface 24 is formed which is similar to the surface 22. In forming the counterbores 21 and 23 in coaxial relationship, as shown, a shoulder 26 is constructed which is utilized in conjunction with the counterbores.

The counterbores 21 and 23 as well as the shoulder 26 cooperate to form a seat for the inner race 31 of the antifriction bearing 17. To this end the race 31 is formed, as by stamping from stainless steel stock, to present an inner conical ring portion 32 and an outer conical ring portion 33, and intermediate thereof, an annular shoulder portion 34. The conical ring portions 32 and 33 of the inner race, as well as the shoulder portion 34 are complementary to the conical counterbores 21 and 23 and the shoulder 26. With this arrangement the inner race 31 seats firmly in the counterbores 21 and 23. The bearing 17 is also provided with an identical outer race 36 which is likewise constructed, as by stamping from stainless steel stock, so as to have an inner conical ring portion 37 and an outer conical ring portion 38 with an intermediate circular shoulder portion 39 therebetween.

In a similar manner the opposite or lower end of the housing 11 is provided with a pair of coaxially conical counterbores 41 and 42 which provide smooth annular surfaces 43 and 44 respectively. The counterbores 41 and 42 are identical to the counterbores 21 and 22 and their construction also forms a circular shoulder or seat 45.

The bearing 18 which is seated within the counterbores 41 and 42 is similar to the bearing 17 and includes an inner race 46 and an outer race 51. As depicted, the race 46 is provided with an inner conical ring portion 47 and an outer conical ring portion 48 with an intermediate shoulder surface 49.

With this construction the inner race 46 of the bearing 18 is firmly disposed within the conical counterbore seats 41 and 42. The outer race 51 of the bearing 18 is identical to the inner race 46 in every respect.

Each of the bearings 17 and 18 is provided with a plurality of balls 53 and 54, respectively, which are preferably of stainless steel. The balls of each of the bearings such as the balls 53 are maintained in operative rolling position between the associated races, as shown. Thus the races not only confine the balls therebetween, but also operate to provide bearing surfaces against which the balls engage in a rolling movement.

For retaining the bearings 17 and 18 in operative position there are provided retaining nut rings 61 and 71.

As shown, the nut ring 61 is provided with a bore 62 and a threaded counterbore 63. The external surface of the nut retainer 61 is provided with coaxial conical step portions which provide angular bevel surfaces 66 and 67. The annular bevel surfaces 66 and 67 are connected by a horizontal shoulder portion 68. The bevel surfaces 66 and 67 as well as the shoulder surface 68 are complementary to the surfaces presented by the outer race 36 of the bearing 17. Thus, the plurality of balls 53 associated with the bearing 17 is confined between the races 31 and 36 rolling on diametrically opposed surfaces presented by the shoulder portion of the outer race 36 and the shoulder portion of the inner race 31 as well as the surface presented by the inner conical portion of the outer race 36 and the surface presented by the outer conical portion of the inner race 31. Retention and preloading of the bearing 17 is accomplished by operation of the nut 61.

In similar manner the outer race 51 of the bearing 18 is seated in complementary formed coaxial double beveled surfaces 72 and 73 formed as the peripheral surface of the retainer nut 71 and these surfaces are likewise connected by an annular horizontal shoulder portion 74. Thus, the plurality of balls 54 of the bearing 18 is confined between the races 46 and 51 and is maintained in operative position by the retaining nut 71.

Disposed in coaxial relationship in the bore 12 of the housing 11 is a coupling member 81 which operates to receive the retainer nuts 61 and 71, and also as a support and carrier. As shown, the coupling member 81 is threaded at each end as at 82 and 83 and threadedly receives the retainer nuts 61 and 71 respectively. Thus, by adjusting the retainer nuts 61 and 71 on the coupling member 81 a desired amount of preloading can be imparted to the bearings 17 and 18. The retainer nuts 61 and 71 not only operate to preload the bearings 17 and 18, but also operate to maintain the components of the bearing assembly 10 in operative relationship.

Disposed within the bore of the coupling member 81 is a driving or working spindle 86. The length of the spindle 86 may be of any desired length and may extend outwardly from the bearing assembly in each direction to any extent desired. By controlling the external diameter of the working spindle 86 to a size just slightly undersized with respect to the internal diameters of the bores 62 and 76 of the nuts 61 and 71 respectively, a neat working interfit will be obtained and maximum support at the extreme outer ends of the bearing assembly will be obtained so that lateral motion of the spindle 86 within the bore is maintained at a minimum.

For sealing the bearings 17 and 18 a pair of sealing rings 91 and 92 are provided. The sealing rings 91 and 92 are identical and each is constructed of a resilient material such as ethylene-propylene rubber. The resiliency of the materials of which the sealing members are constructed allow the seals to be stretched over the ends of the bearing assembly without impairing their inherent functional characteristics. The inner surface of each of the seals is formed with annular bevel surfaces 93 and 94. Thus, with the seal 91 disposed in position, as shown, a bevel surface such as the surface 93 of the seal 91 will engage the bevel annular surface of the outer conical position 38 of the outer race 36 of the bearing 17. This effectively prevents the sealing rings from entering too deeply within the bearing assembly and retains the seal in operative sealing position. A similar condition obtains for the seal 92 associated with the bearing 18.

For securing the working spindle 86 to the coupling member 81 in rotatably supported relationship, a bolt 90 or other securing device is provided. For engaging the bolt 90 in operative coupling arrangement, the housing 11 is provided with diametrically opposite access ports 95 and 96. Thus, insertion of the bolt 90 through aligned openings 97 and 98 in the wall of the tubular coupling member 81 and a bore 99 in the working spindle 86 can be easily accomplished through the port 95. A nut 100 is engaged on the threaded extending end of the bolt 90 and tightened thereon by means of a suitable wrench (not shown) which can be easily inserted through the opposite access port 96. Plugs 101 and 102 are inserted in the access ports 95 and 96 and operate to seal the interior of the housing.

An additional advantage of the bearing assembly herein described is the fact that since each bearing is provided with identical races, such as the races 31 and 36 associated with the bearing 17, should any galling or excessive wear occur, the races may be interchanged. By interchanging the positions of the races 31 and 33 new surfaces are presented for the balls 53 to roll on. Thus, with the novel bearing construction herein set forth, the usable life of the bearing is extended.

In the illustrative bearing assembly 10 herein depicted, the housing 11 is provided with a circular outwardly extending radical flange portion 103. The flange 103 is provided with a plurality of openings 104 through which bolts or screws (not shown) may be inserted to secure the assembly to other structures such as a plate 106.

The embodiments of the invention in which an exclusive property or privilege is claimed are defined as follows:

1. In a universal bearing assembly;
   a housing having an axial bore;
   a tubular coupling within the bore of said housing;
   antifriction bearings disposed in spaced relationship within the bore of said housing, said bearings being disposed about said tubular coupling but not in contact with it;
   retainer means on each end of said tubular coupling in bearing engagement with an adjacent one of said antifriction bearings and operable to maintain said bearings and said tubular coupling in coaxial operative position within the bore of said housing.

2. A universal bearing assembly according to claim 1 wherein said retainer means on each end of said tubular coupling are nuts having threaded bores, and said tubular coupling has each end thereof constructed and arranged to threadedly receive said threaded nuts.

3. In an antifriction bearing;
   a first race having an annular tapered outer portion, an annular tapered inner portion and an annular flat portion interconnecting an annular edge of said outer portion to an annular edge of said inner portion;
   a second race having an annular tapered outer portion, an annular tapered inner portion and an annular flat portion interconnecting an annular edge of said outer portion to an annular edge of said inner portion, said first and second races being of substantially identical configuration so as to be interchangeable; and a plurality of balls disposed between said races in position to engage with a plurality of opposed surfaces of said first and second races.

4. In a bearing for radial and thrust loads;

a first race comprising a stamping having a first portion formed as a frustum of a cone and a second portion formed as a frustum of a smaller cone, said first and second portions being disposed in coaxial stepped relationship;

said stamping presenting bearing surface on each side thereof;

a second race comprising a stamping having a first portion formed as a frustum of a cone and a second portion formed as a frustum of a smaller cone, said first and second portions being disposed in coaxial stepped relationship, said stamping presenting bearing surfaces on each side thereof; and, a plurality of balls disposed between said first and second races in engagement with two intersecting surfaces on each of said races, said bearing surfaces of each of said races being diametrically opposite to each other, whereby the positions of said first and second races may be interchanged to present unworn bearing surfaces for the balls to roll on.

5. A bearing for radial and thrust loads comprising:

a circular first race having an axial opening and a circular second race having an axial opening, said races being disposed in spaced apart coaxial relationship, said first and second races being constructed and arranged in a manner to have identical configurations, said races each having at least two bearing surfaces; and, a plurality of balls disposed between said first and second races in position to engage with the bearing surfaces of said first and second races in a manner that imaginary lines which are parallel to the axes of said races will pass through associated axes of said balls and through a bearing surface of each of said races at an angle normal to bearing surface, and also other imaginary lines which intersect the axes of said races will pass through the center associated ones of said balls and through the other bearing surface of each of said races at an angle normal to the bearing surface.

6. In a universal bearing assembly;

a housing having an axial bore;

a tubular coupling within the bore of said housing;

a pair of antifriction bearings disposed in spaced relationship within the bore of said housing and arranged therein about said tubular coupling but not in contact with it, said bearings each comprising a pair of races of identical configuration, each of said races presenting identical front and rear bearing surfaces whereby either race may be used as the inner or outer race of a bearing;

a plurality of balls disposed between said races of each of said bearings; and, retainer means adjustably secured on each end of said tubular coupling in engagement with an adjacent one of said antifriction bearings and operable to maintain said bearings and said tubular coupling in coaxial operative position within the bore of said housing.

7. A bearing according to claim 6 wherein said races and said balls are of a stainless steel material.

* * * * *